Feb. 1, 1927.
C. J. CARLSON
1,615,901
UNIVERSAL SAWING OR CUTTING MACHINE
Filed Jan. 14, 1924     8 Sheets-Sheet 1
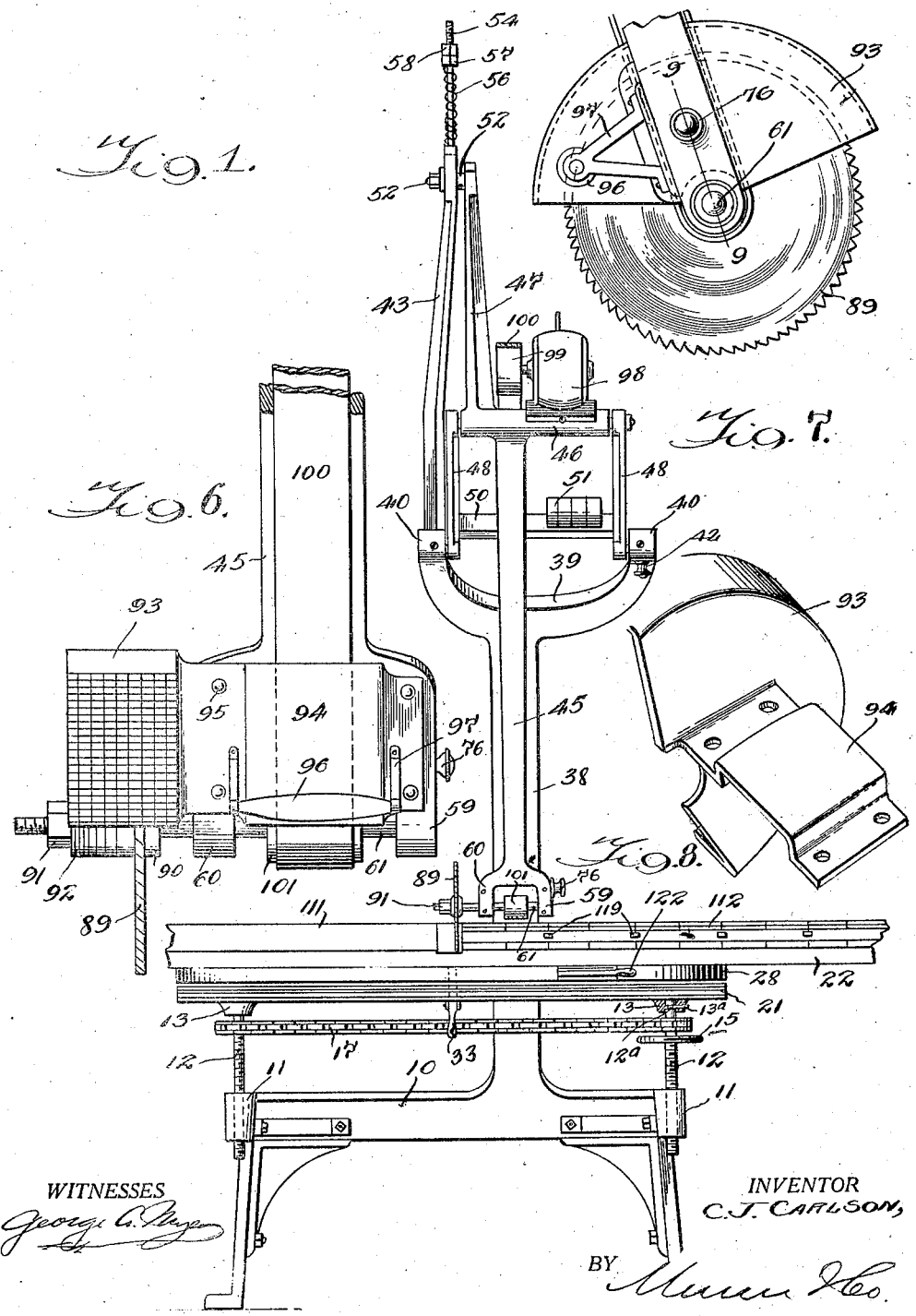
WITNESSES
INVENTOR
C. J. CARLSON,
BY
ATTORNEYS

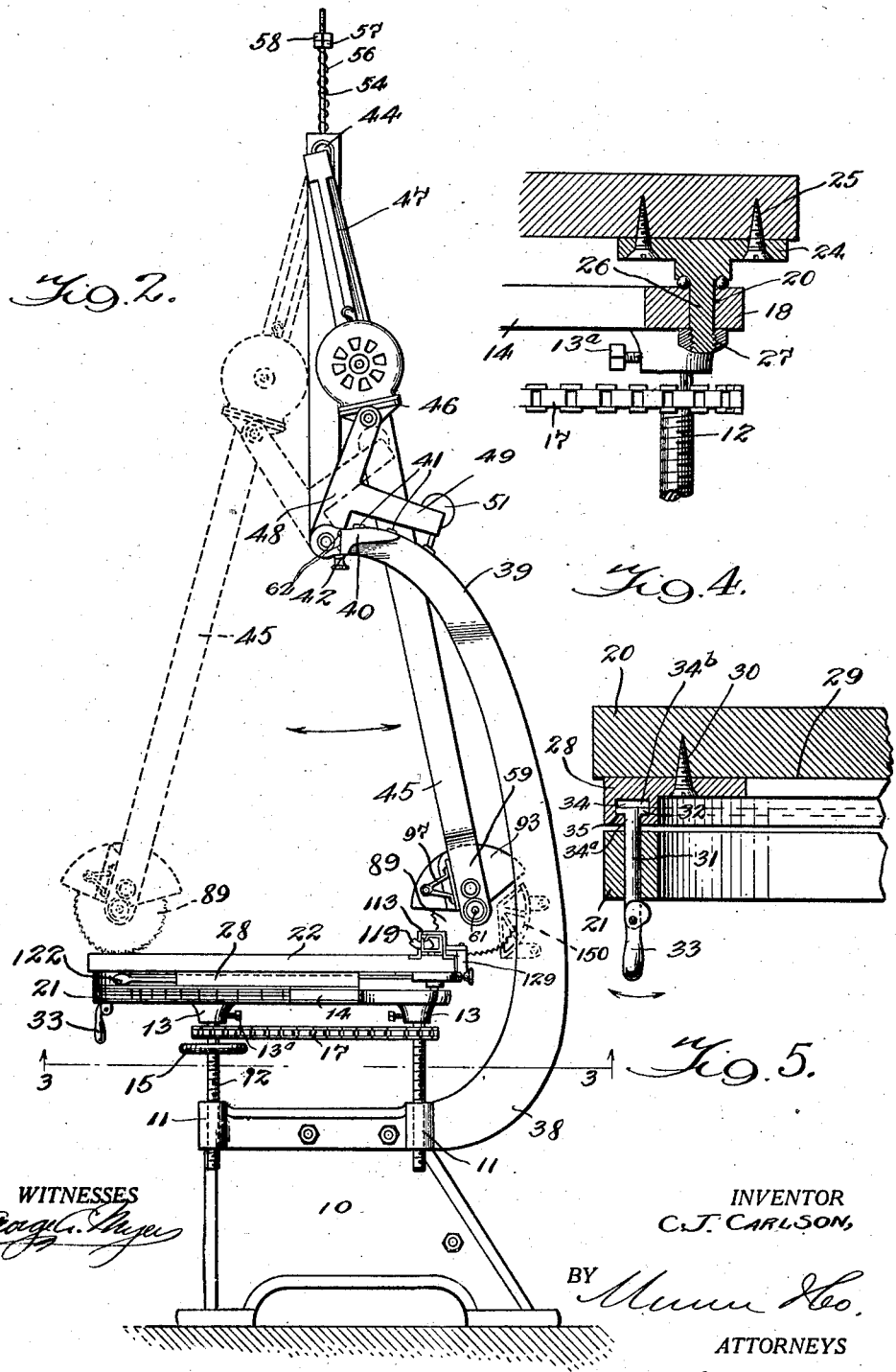

Feb. 1, 1927.  1,615,901
C. J. CARLSON
UNIVERSAL SAWING OR CUTTING MACHINE
Filed Jan. 14, 1924   8 Sheets-Sheet 3
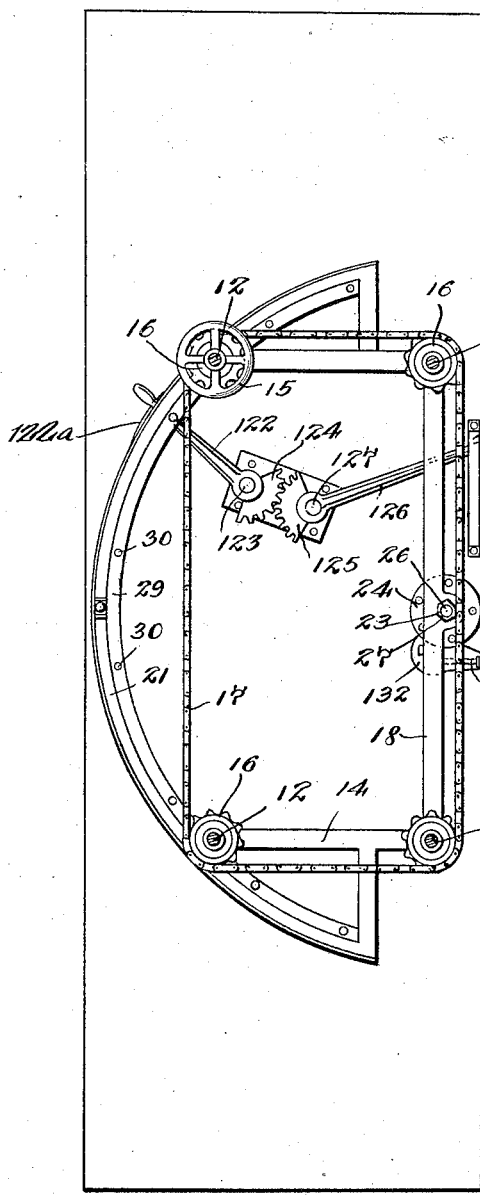
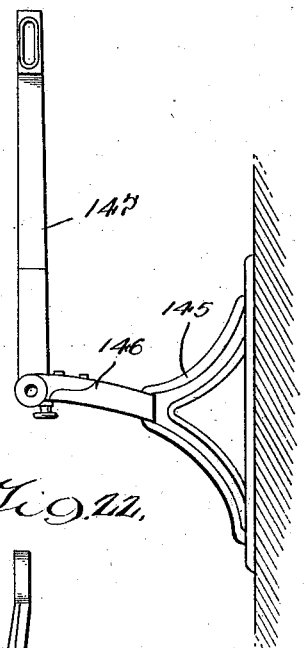
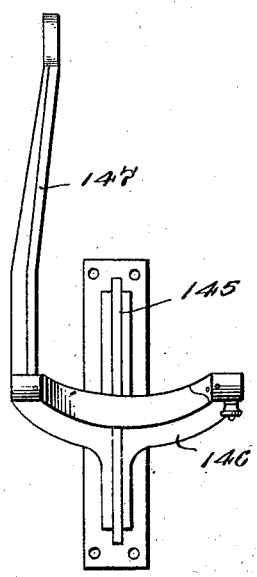
WITNESSES
INVENTOR
C. J. CARLSON,
BY
ATTORNEYS

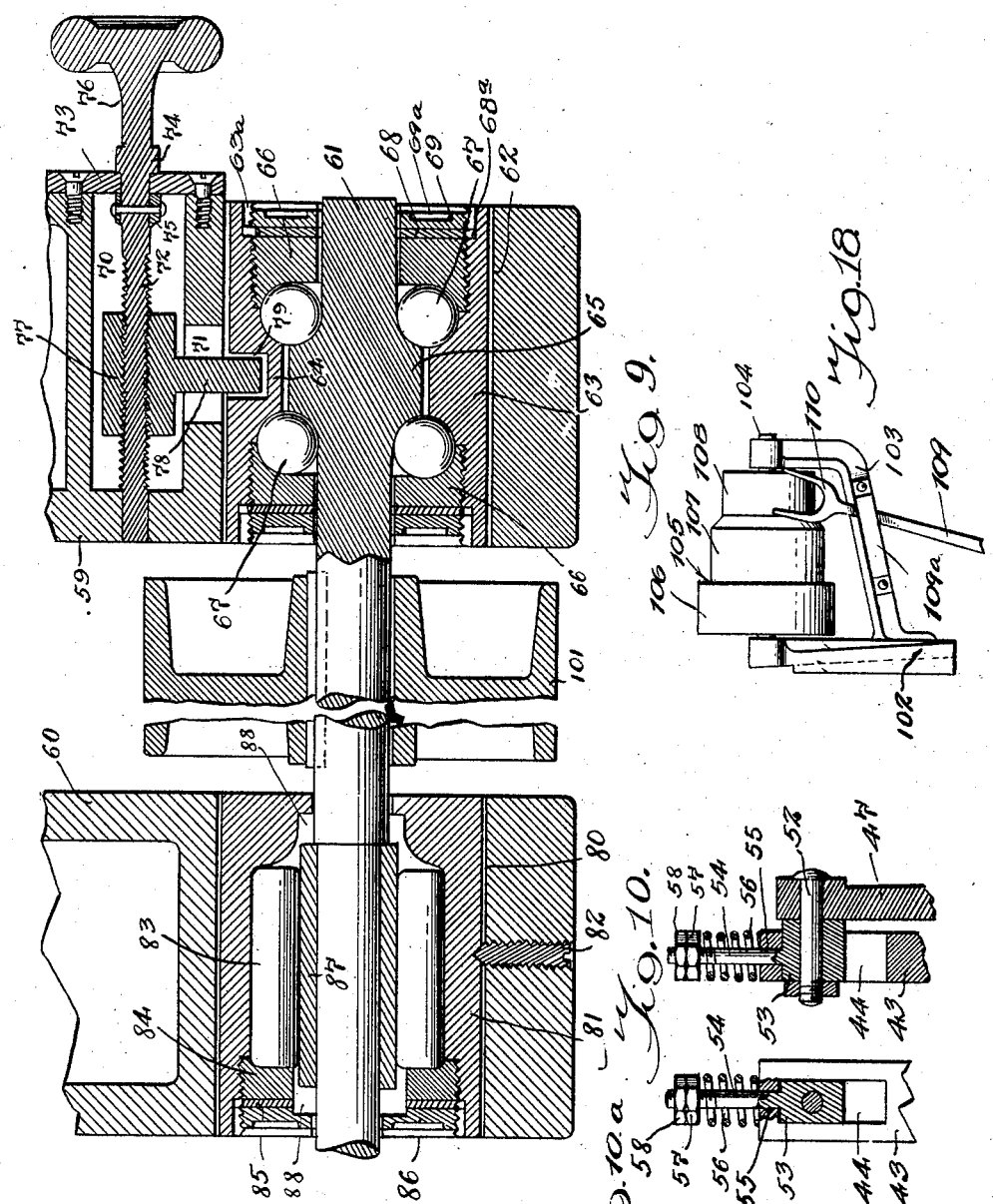

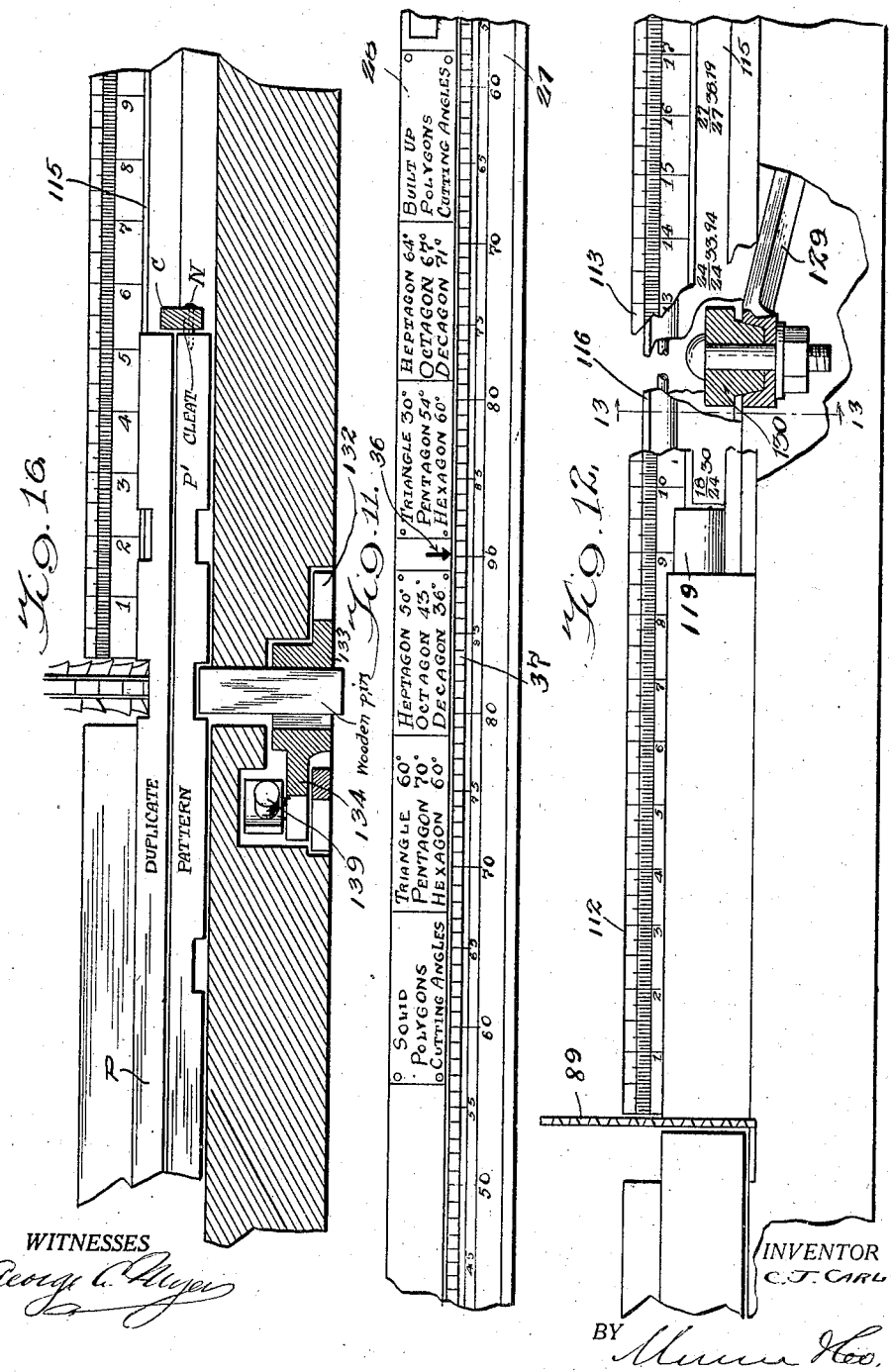

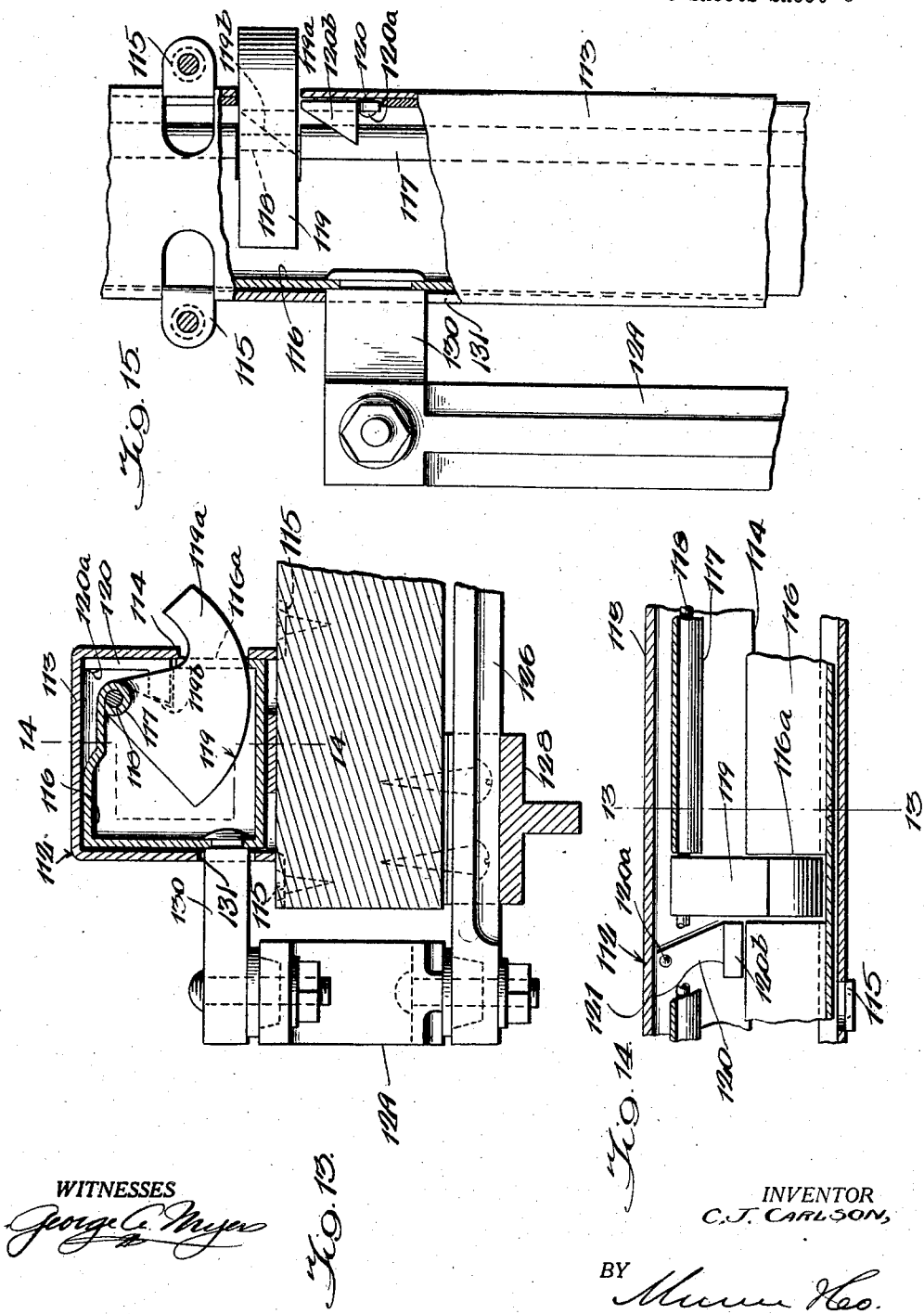

Feb. 1, 1927.
C. J. CARLSON
1,615,901
UNIVERSAL SAWING OR CUTTING MACHINE
Filed Jan. 14, 1924
8 Sheets-Sheet 7
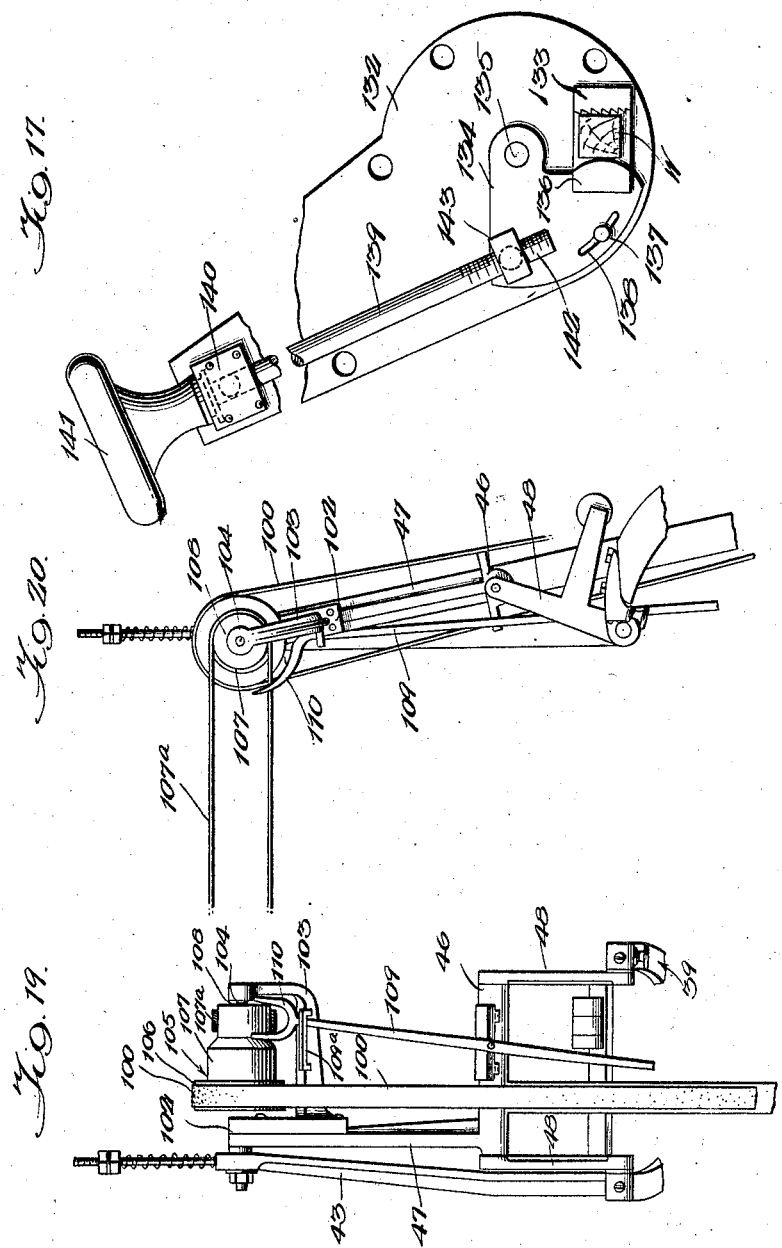
WITNESSES
INVENTOR
C. J. CARLSON,
BY
ATTORNEYS Feb. 1, 1927. 1,615,901
C. J. CARLSON
UNIVERSAL SAWING OR CUTTING MACHINE
Filed Jan. 14, 1924    8 Sheets-Sheet 8
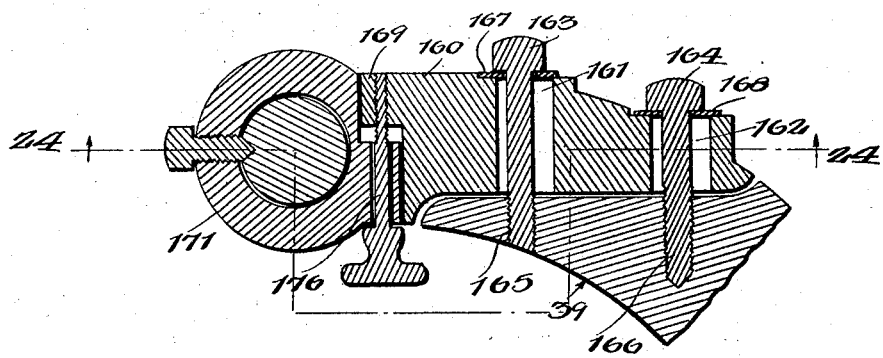
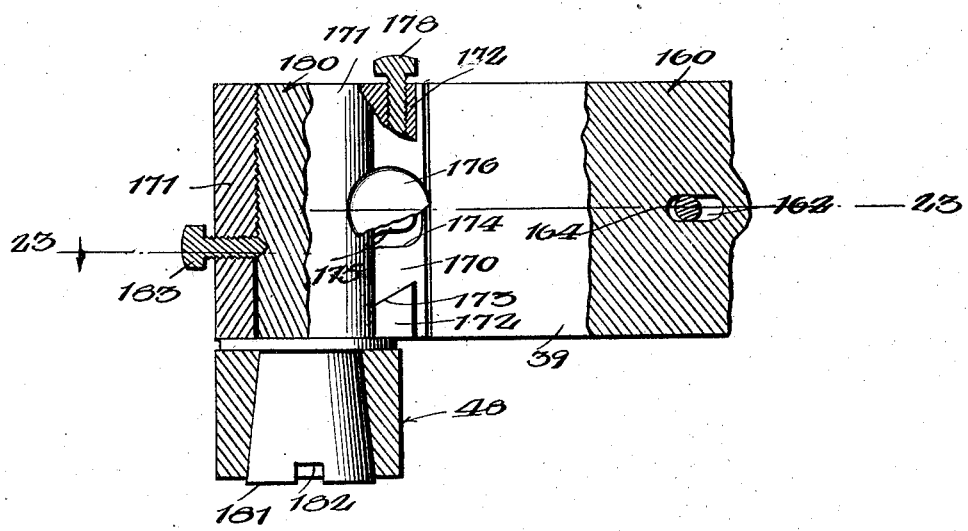

Patented Feb. 1, 1927.

1,615,901

UNITED STATES PATENT OFFICE.

CHARLES J. CARLSON, OF HELENA, MONTANA.

UNIVERSAL SAWING OR CUTTING MACHINE.

Application filed January 14, 1924. Serial No. 686,086.

This invention relates to a universal sawing or cutting machine designed and adapted to carry out many and widely diversified wood working operations.

Accordingly the invention consists in the provision of a sawing machine having a circular blade or saw, supported and propelled from above and designed to be moved back and forth, over and across the bench upon which the work rests. The bench is so designed as to be conveniently raised or lowered to provide for the desired depth of cut and the blade or saw is so mounted and controlled as to move in a straight line across the bench for the full length of its operative movement. Also the bench is so designed and arranged and so organized with the other elements of the machine as to permit of the cutting of any angle or mitre from thirty degrees in one direction to thirty degrees in the other direction. Moreover the adjustable and operating parts of the bench construction have connected therewith and organized therein scales and computing devices for the easy and immediate convenience of the operator. The adjustment of the machine to any desired position and for any desired purpose is simple and may be carried out quickly and easily.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a fragmentary view, in front elevation, showing the preferred embodiment of the invention, parts being removed and shown in section for the sake of illustration;

Figure 2 is a view in side elevation of the apparatus shown in Figure 1;

Figure 3 is a view in horizontal section, looking in the direction of the arrows, on line 3—3 of Figure 2;

Figure 4 is a fragmentary view, partly in section and partly in elevation, showing the manner in which the table proper or bench is pivotally connected to its frame;

Figure 5 is a view similar to Figure 4, showing the releasable locking means for securing the table in adjusted position on its frame;

Figure 6 is a fragmentary view in front elevation showing the saw assembly;

Figure 7 is a similar view thereof in side elevation;

Figure 8 is a fragmentary perspective view of the guard for the saw assembly;

Figure 9 is a view, in section, showing the details of the mounting of the saw arbor, the section being taken approximately on line 9—9 of Figure 7 and parts being omitted for the sake of illustration;

Figures 10 and 10ª are detail views of the slide bearing for the main swinging arm;

Figure 11 is a fragmentary view in enlarged front elevation of the front faces of the table top and frame showing the manner in which these parts are graduated and provided with indicia;

Figure 12 is a fragmentary view, partly in elevation and partly in section illustrating the adjustable stop and gage employed on the bench;

Figure 13 is a view thereof in transverse vertical section taken approximately on line 13—13 of Figure 14;

Figure 14 is a sectional view on line 14—14 of Figure 13;

Figure 15 is a fragmentary bottom plan view with parts broken away and shown in section for the sake of illustration;

Figure 16 is a fragmentary view, partly in elevation and partly in section, showing the manner in which the clamp provided under the table is organized with the table in doing duplicate work;

Figure 17 is a detail view of the clamp shown in Figure 16;

Figure 18 is a detail view of the pulley assembly which may be used in lieu of the electric motor;

Figures 19 and 20 are fragmentary views in front and side elevation respectively showing the pulley assembly in use;

Figure 21 is a view in side elevation of a modified support for the main swinging arm;

Figure 22 is a view of the support in front elevation;

Figure 23 is a detail view in vertical section on line 23—23 of Figure 24, showing the details of one of the adjustable bearing members of the support; and Figure 24 is a similar view in horizontal section, on line 24—24 of Figure 23.

Referring to the drawings, the numeral 10 designates a suitable base having at each corner a nut or internally threaded bearing sleeve 11. In each bearing sleeve 11 a vertical adjusting screw 12 has operative threaded engagement. The upper end of each adjusting screw is plain and smooth and has a swiveled connection with a boss 13 provided for each adjusting screw on the under side of a table or bench frame 14. This swivelled connection may be had by providing an annular groove $12^a$ in the screw and providing a pin $13^a$ on the boss which extends into the groove $12^a$ as illustrated in connection with the pivot shown in section in Figure 1. One of the adjusting screws has fixed thereto a hand wheel 15 whereby these screws may be turned. The motion of the screw equipped with the hand wheel is imparted to the other screws by means of chain and sprocket gearing made up of sprockets 16 keyed to the screws 12 adjacent their upper ends and a sprocket chain 17 trained over the sprockets 16.

The table or bench frame 14 which may be cast integral or otherwise formed is made up of a number of bars of which one designated at 18 is provided with a bearing socket 20. This frame 14 also includes an arcuate bar or rail 21 which is concentric with the axis of the bearing socket 20. The table or bench proper is designated at 22 and consists of a piece of wood or other suitable material of suitable dimensions which is mounted for horizontal swinging adjustment on the table frame 14 by means of the pivot designated generally at 23 and comprising a circular plate 24 secured to the under side of the table by means of screws 25 and having integrally formed therewith a depending stud or pivot bolt 26 which is rotatably fitted in the socket 20 in the table frame and which is held against upward movement in said socket by means of a nut 27. An arcuate bearing bar or shoe 28 corresponding in curvature to the rail 21 is provided and is formed with a flange 29 secured by screws 30 to the table 22. The arcuate bearing bar or shoe 28 bears on the bar or rail 21 and in conjunction with the pivot 23 supports the bench or table on the frame 14 for swinging movement or angular adjustment in a horizontal plane.

Means is provided for releasably securing the table in adjusted position relative to its frame and preferably this means comprises a vertically reciprocable locking rod 31 having a head 32 at its upper end controlled by means of a hand operated cam member 33 which is pivoted to the rod and which engages the under side of the arcuate bar or rail 21. The upper portion of the rod 31 and its head 32 operate in a slot 34 provided in the arcuate shoe 28 and extending from end to end thereof so that in assembling the locking rod with the shoe 28, the shoe is moved endwise to bring the head 32 and the upper end of the rod 31 into the slot 34. The slot 34 is shaped in cross section as shown in Figure 4 having a narrow portion $34^a$ for the reception of the upper end of the rod 31 and an enlarged portion $34^b$ in which the head 32 operates. The enlarged portion $34^b$ has a vertical dimension greater than the vertical dimension of the head 32 so that this head 32 can move up and down in the enlarged portion $34^b$ of the slot 34. When the head 32 is brought down as far as it may be in the enlarged portion $34^b$ of the slot 34 it engages shoulders 35 with binding or clamping force to hold the bench or table in adjusted position relative to its frame.

In order that the degree of the horizontal adjustment of the table 22 with respect to its frame 14 may be accurately gaged the front face of the shoe 28 is provided with an arrow 36 and the front face of the rail 21 is provided with numerals or indicia 37 representing angular measurements, the arrow 36 coacting with the indicia 37 to provide a convenient gage of the adjustment (see Fig. 11).

A curved supporting member 38 is integrally formed with or suitably connected to the base 10 at its lower end and extends around the rear of the bench or table and above the same, as clearly shown in Figure 2. The upper end of the supporting member is made in the form of a yoke 39 and on the arms of the yoke bearings 40 are adjustably mounted as will be hereinafter more fully described. A standard 43 is secured to one of the arms of the yoke 39 and upstands therefrom and the upper end of the standard is slotted to provide a guide or bearing 44, as shown in Figure 10. A main swinging arm 45 is provided and preferably is hollow cast to make it light and easy to handle and at the same time give the greatest possible strength with the least material. At its upper end this arm 45 has integrally formed therewith a cross bar 46 and an extension of the arm 45 or a carrier arm 47 is integrally formed with the cross bar 46 and is slightly offset from the main swinging arm 45. Preferably the extension or carrier arm 47 is T-shaped in cross section. The cross bar 46 is pivotally connected to the upper ends of carrier links 48, the lower ends of the links 48 being pivotally mounted on the bearings 40. Intermediate their ends and preferably nearer to the lower ends than the upper ends, the links 48 are provided with integral and rearwardly extending bracket arms 49 connected by a cross piece 50 to constrain the links 48 to corresponding movement and to provide a support for weights 51 which serve to back balance the main swinging arm and the other elements of the saw assembly as will be hereinafter more fully pointed out. At the upper end of the carrier arm or extension 47 a laterally extending pivot bolt or stud 52 is attached or may be cast therewith if found convenient. This pivot bolt is rotatably fitted in an opening provided therefor in a slide block 53 (see Figure 10), the slide block being mounted for vertical reciprocal movement in a bearing slot 44 of the standard 43. A guide stem 54 is rigidly connected to the upper end of the block 53 and slidably extends through a guide opening 55 provided therefor in the upper end or top of the standard 43. A compression coil spring 56 encircles the stem 54 above the standard and at its lower end it abuts the top of the standard while at its upper end is tensioned by a nut 57 threaded on the guide stem 54 and held in adjusted position by a lock nut 58. The spring 56 counterbalances the swinging saw assembly in certain phases of its movements as will be hereinafter fully pointed out.

At its lower end the main swinging arm 45 is yoked to provide bearing arms 59 and 60. A rotatable saw arbor 61 is provided and is journaled in bearing arms 59 and 60 in a manner which will now be described. As clearly shown in Figure 9 the bearing arm 59 is machined or otherwise formed to provide a transverse opening 62 in which a sleeve 63 is fitted for endwise adjustment. The sleeve 63 is provided centrally with an internal annular flange 64 which in the assembly is opposed by an external annular flange 65 integrally formed on the saw arbor 60 and the lateral faces of these two flanges are machined or suitably formed to provide in conjunction with cones 66 threaded in each end of the sleeve a pair of ball races in which ball bearings 67 are operatively arranged. The cones 66 are held in adjusted position by lock nuts 69, washer 68 being interposed between the nuts 69 and the cones 66 and having peripheral fingers 68ª slidably fitted in longitudinal grooves 63ª provided in the sleeve 63. The exposed faces of the lock nuts 69 are provided with recesses or grooves 69ª for the reception of a wrench or the like. Above the transverse opening 62 a cavity 70 is provided in the bearing arm 59 and communicates with the opening 62 by a passage 71. An adjusting screw 72 is arranged within the cavity 70 and is operatively mounted on the arm 59 and on a plate 73 fastened to the arm to close the cavity 70 and to assist in supporting the adjusting screw. Collars 74 and 75 are provided on the adjusting screw on each side of the plate 73 to hold the same against axial displacement. Exteriorly of the cavity 70 the adjusting screw is provided with a knob 76 so that it may be conveniently manipulated. A travelling nut 77 is operatively fitted on the screw 72 and is provided with a finger 78 which extends therefrom through the passage 71 and into a socket 79 provided therefor in the sleeve 63. The passage 71 is of such cross section in respect to the form and size of the finger 78 as to serve to guide the finger and the nut 77 to rectilinear movement when the adjusting screw is turned. The socket 79 is made to snugly fit the finger 78 so that this finger controls the endwise adjustment and position of the sleeve. The finger 78 may also serve to control the angular movement or position of the sleeve 63 if desired but preferably the sleeve 63 is of polygonal cross section and the opening 62 of corresponding formation so that relative angular movement between the sleeve and bearing arm is prevented although of course the sleeve may readily move endwise. The bearing arm 60 is also provided with a transverse opening 80 in which a sleeve 81 is fitted and held by means of a set screw 82. The sleeve 81 is internally formed to provide a race for roller bearings 83 which are held in position by a cone 84 having threaded engagement with the sleeve and locked in adjusted position by a lock washer 85 and a lock nut 86. The roller bearings 83 do not however bear directly on the saw arbor but engage a bushing 87 shrunk or otherwise suitably secured on the saw arbor within the sleeve 81. The arrangement is such that there is a clearance 88 between each end of the bushing 87 and the adjacent structure of the bearing so that the saw arbor and bushing may move endwise relative to the roller bearings 83 and to the other elements of the bearing structure, when the saw arbor is adjusted by manipulating the adjusting screw 72.

A circular saw blade 89 is mounted on the saw arbor 61 and is held against a collar 90 by a nut 91 threaded on the saw arbor and acting on the saw blade through a series of filler collars 92. The filler collars 92 are provided as it is proposed to employ in conjunction with the saw blade or in lieu thereof any desired number or arrangement of dado knives or other cutters. A guard 93 is provided for the saw blade and has integrally formed therewith an offset guard plate 94 for the driving belt to be hereinafter described. This guard is bolted, as at 95 to the bearing arms and bears on its face a number table to show how much lumber is in a certain size piece cut. A handle 96 is provided and is secured to the bearing arms by handle brackets 97.

The saw arbor is driven from an electric motor 98 mounted on a base provided therefor on the cross bar 46 and having a driving pulley 99 fixed to its armature. A belt 100 is provided, and is trained over the driving pulley 99 and extends down along the main swinging arm 45 and over a driven pulley 101 fixed to the saw arbor between the bearing arms 59 and 60. The run of the belt which extends down along the front face of the swinging arm travels between the offset guard plate 94 and the space between the bearing arms, as indicated in Figure 6.

If found convenient the saw may be driven from the line shaft or from any other similar source of power instead of an electric motor, the electric motor being removed and the device shown in Figures 18, 19 and 20 being substituted therefor in this event. Of course it is to be understood that the electric motor is bolted to the base provided therefor on the cross bar 46 and may be conveniently removed therefrom. As shown in Figures 18, 19 and 20 this device consists of an attaching arm 102 adapted to fit around the extension or carrier arm 47 and to be bolted thereto. A bearing bracket arm 103 is integrally formed with the attaching arm 102 and these two parts provide bearings in which the rotatable shaft 104 is journaled. A double pulley 105 is mounted on the shaft so that the largest pulley thereof designated at 106 drives the belt 100 and the smaller pulley 107 of this double pulley receives the drive from the line shaft by means of a belt 107$^a$. An idler 108 is also mounted on the shaft 104. A belt shifter 109 is pivotally mounted on the motor base of the cross arm 46 and has a curved fork 110 at its upper end to control the position of the driving belt when the line shaft drive is used. A guide 109$^a$ is provided for the belt shifter.

A plain wood gage or fence 111 is fixed to the top of the table 22 on one side of the saw and on the opposite side thereof an automatic stop and gage designated generally at 112 is provided and will now be described. This automatic stop and gage consists of an outer elongated metallic shell 113 which may be conveniently formed of a single piece of metal and which is of substantially rectangular form in cross section. The longitudinal edges of the metal forming the shell 113 are vertically spaced and define a slot 114 extending lengthwise from end to end of the front face or wall of this shell 113. This front face also bears above the slot graduations and numbers, designating inches and feet. The bottom of the shell 113 has stamped therefrom attaching lugs 115 secured by screws or the like in countersunk openings in the table top. An inner shell 116 is slidably fitted within the outer shell and this shell 116 may also be conveniently formed of a single piece of metal and preferably takes the cross section shown in Figure 13. One portion of the inner shell is curled, as at 117, to provide a bearing for a pivot rod 118 by which pivoted stop blocks 119 are pivotally supported. These stop blocks are freely suspended on the pivot rod 118 and are so formed that their noses 119$^a$ project through notches 116$^a$ provided in the inner shell and through the slot 114 of the outer shell. However the stop blocks may be readily pushed in the shell when found desirable. Preferably these stop blocks are provided at one foot intervals and their noses 119$^a$ may be accurately adjusted along the outer shell by means of the provision of graduations and scales thereon representing feet and inches or other quantities.

In the present embodiment of the invention it is proposed to have the stops 119 move through a range of twelve inches and to automatically retract the stops 119 into the shells if they are moved a half inch further, that is if they are moved twelve and one half inches. For this purpose a cam 120 is provided for each stop block. The cams 120 are pivotally supported on the outer shell 113 as at 120$^a$ and have inclined or camming faces 120$^b$ cooperable with similar surfaces 119$^b$ provided on the stop blocks 119. The cams 120 are formed with stop shoulders 121 to limit their swinging movement in one direction, that is in a clockwise direction, as viewed in Figure 14, but they are freely movable in an opposite direction. By this arrangement it is possible to increase the range of movement of the stops 119 for by moving the stops 119 slightly more than twelve and a half inches, they will slide past their cams 120 and their nose 119$^a$ will be projected exteriorly of the shells. Moreover the cams 120 do not interfere with return movement of the stop block 119 since these cams 120 freely move about their pivots 120$^a$ to permit such return movement.

In order to provide for convenient adjustment of the inner shell within the outer shell and consequently for convenient adjustment of the stop blocks along the outer shell an operating bar 122 (see Fig. 3) is pivotally supported, as at 123, on a plate provided therefor on the under side of the table. The handle portion of this bar projects through a slot provided for the same in the shoe 28 (see Fig. 1). A spring plate 122$^a$ is carried by the shoe 28 and engages the handle portion of the operating bar 122 to releasably hold the same in adjusted position. The inner end of the operating bar has integrally formed therewith a gear sector 124 which meshes with a similar gear sector 125 provided on a similar arm or bar 126 which is also pivotally mounted, as at 127. This bar 126 is guided by a strap 128 fixed to the under side of the table and embracing the bar and is pivotally secured to one end of a connecting rod 129, the opposite end of which connecting rod is pivotally attached to a pin or arm 130 (see Fig. 13) which extends through a slot 131 in the rear wall of the outer shell and is rigidly connected to the rear wall of the inner shell.

A vise or clamp is provided for use in doing duplicate work and is shown to advantage in Figures 3, 16 and 17. The operating parts of this vise are housed in recesses provided therefor in the under side of the table and comprise a fixed plate 132 fastened to the table and having integrally formed therewith a fixed jaw 133. A movable plate 134 is pivotally supported, as at 135, on the fixed plate and carries a movable jaw 136 which coacts with the fixed jaw in holding the wood pin W. The plate 134 is guided and held to movement within certain limits by a guide pin 137 carried by the fixed plate and an arcuate guide slot 138 provided in the movable plate and in which the guide pin operates. For manipulating the movable plate a shaft 139 is provided and is rotatably mounted in a bearing 140 provided therefor on the fixed plate. This shaft extends beyond the rear of the table and is provided with a hand wheel 141 whereby it may be readily turned. The end of the shaft opposite the hand wheel is screw threaded, as at 142, and is operatively fitted in the threaded opening of a nut 143 which is swiveled or rotatably mounted on the movable plate. The bearing box 140 for the shaft can also be swiveled on the fixed plate if found desirable. The wood pin W projects upwardly in an opening provided therefor in the table and coacts with the notches provided in the pattern P'. The duplicate designated at P is supported on the pattern, and is controlled as to its position by the cleat C nailed at its end to the pattern.

It is to be understood that the swinging saw assembly may be used with other types of benches not herein disclosed, and in order to provide for this exigency it will be necessary to provide a support such as shown in Figs. 21 and 22 wherein lieu of carrying the supporting member on the bench it is carried by a wall bracket 145. A yoke, designated at 146 and a standard 147 are provided and are identical with those herein-above described and designated at 39 and 43, respectively.

In operation, the bench may be readily adjusted as to height by manipulating the hand wheel 15 which turns all of the adjusting screws 12 by virtue of the action of the sprocket chain 17 and sprockets 16. When the desired height has been attained the table may be readily adjusted angularly in a horizontal plane by releasing the lock rod 31 and swinging the table relative to its frame and about its pivot 26. In all adjustments the table is properly supported on its frame by virtue of the provision of the arcuate shoe 28 and the arcuate rail or track 21 which operates in conjunction with a pivot to pivotally support the table on the frame. Again the table may be locked in any adjusted position by manipulating the cam member 33. The degree of adjustment may be accurately determined by observing the position of the arrow 36 with respect to the indicia 37.

According to the character of the work being done the vise, the automatic stop and gage or the plain wooden fence is used. In Figure 12 the automatic stop and gage 112 is shown in use, a piece of board eight and three fourths inches being cut. In any event when the sawing or cutting is to be done the operator grasps the handle 96 and again easily and conveniently draws the saw blades or cutters back and forth across the table. These cutters do not however swing in an arc but travel in a straight line so as to produce the proper form of cut. This straight line travel of the cutters or saw blades is obtained by the peculiar mounting of the swinging arm on the links 48 and the standard 43. Moreover the swinging arm is properly counterbalanced and backbalanced. In considering this it is well to bear in mind that the purpose of the spring 56 is to freely counterbalance the weight of the swinging arm especially in the two out positions. Without this spring the main swinging arm would hang in the two extreme positions and there would be a noticeable difference to the operator in the amount of pull necessary to bring the swinging arm from the rear to the center, while from center to forward it comes very much easier. Likewise on the return movement more force will be necessary to return the swinging arm to center than from center to back. The weights 51 are also essential to the proper action of the swinging arm especially in the rear half of its travel. These weights bring the swinging arm to rest at the extreme rear position and hold it there. They also steady the motion of the arm and prevent its jumping in variable work. Without the weights 51 the main swinging arm would hang over the center of the lathe.

The adjustable mounting of the saw arbor makes it possible to adjust the saw arbor assembly to the right or left so as to dispose the saw at the proper distance from the graduated scale. The use of the vise is shown to advantage in Figure 15.

An open work guard designated at 150 is provided on the supporting member 38 to guard the saw in its rearmost position and is made of open mesh so that it will not throw the sawdust back to the operator.

The bearings 40 are of identical construction, and each comprises a bearing block 160 mounted for longitudinal adjustment back and forth on an arm of the yoke support. The bearing block is provided with vertical slots 161 and 162, the slots 161 and 162 being slightly elongated. Screws 163 and 164 are extended through the slots 161 and 162, respectively, and have threaded engagement with the underlying arm of the support, as indicated at 165 and 166 respectively. Washers 167 and 168 are interposed between the heads of the bolts 163 and 164 and the portions of the block 160 which underlie these heads. This arrangement provides for longitudinal adjustment of the block 160 and at the same time makes it possible to securely and positively hold the block in any adjustment. The block 160 includes an overhanging shoulder 169 below which an undercut or dove-tailed shaped tenon 170 is formed. A sleeve bearing member 171 is provided, and has a pair of wing members 172 under cut to define a dove-tailed shaped slot 173 between them with which the similarly shaped tenon 170 engages. The tenon 170 is provided with a vertical slot 174 in which an apertured lug 175 freely operates, the lug 175 being integrally formed with the sleeve bearing member 171. A screw 176 is provided and has a smooth portion rotatably fitted in the lug 175 and a threaded portion engaged with a threaded opening provided therefor in the shoulder 169 of the block 160. In this manner the sleeve bearing 171 is mounted for vertical adjustment on the block 160 and this vertical adjustment is nicely controlled by the screw 176. In order to releasably hold the sleeve bearing in its vertical adjustment set screws 178 are threaded into one of the wings 172 and are engageable with the adjacent portion of the tenon 170. An externally threaded plug, designated at 180 is provided and has a smooth and tapered head 181. The plug is inserted through the opening provided therefor in the lower end of its carrier link 48 and the tapered head 181 engages with the similarly formed opening in the carrier link, the externally threaded portion of the plug being engaged with the internal threads of the sleeve bearing member 171. A slot 182 is provided in the head 181 to facilitate assembly. A set screw 183 serves to lock the plug in the sleeve bearing member. By providing mountings or bearings of this character for the links 48 perfect alinement may be maintained irrespective of the character of wear or of the distortion due to vibration, expansion, contraction or other causes.

I claim:

1. In a machine of the character described, a support, carrying links mounted on the support, a main swinging arm having a cross bar pivotally connected to the carrying links, a standard carried by the support, said main swinging arm having its upper end slidably connected to the standard, and a saw assembly mounted on the lower end of the main swinging arm.

2. In combination, a work bench, a support extending above the work bench and having a standard, links pivotally mounted on the support, a swinging arm pivotally connected to the links and having sliding bearing on the standard, a spring counterbalance for the swinging arm, said spring counterbalance being cooperable with the sliding bearing, a counterweight for the swinging arm, said counterweight being carried by the links, and a saw assembly carried by the lower end of the swinging arm.

3. In combination, a work bench, a supporting member extending above the same and having a standard, links pivotally connected to the supporting member, a main swinging arm having a cross bar and an extension, links pivotally connected to the supporting member and to the swinging arm, means for connecting the upper end of the extension to the standard, including a slide bearing, the lower end of the swinging member being yoked, a saw arbor journaled in the arms of the yoke, means for driving the saw arbor including a pulley fixed to the saw arbor between the arms of the yoke, an electric motor fixed to the cross bar and a belt extending along the main swinging arm for driving the pulley on the saw arbor from said electric motor.

4. In combination, a main saw supporting arm having bearing arms provided with transverse openings, a saw arbor, a ball bearing assembly for mounting the saw arbor in the opening of one of said bearing arms, a roller bearing assembly for mounting the saw arbor in the opening of the other bearing arm, the saw arbor being constrained to partake of the axial movement of the ball bearing assembly though free to rotate relative thereto, the saw arbor being axially as well as angularly movable with respect to the roller bearing assembly, and means cooperable with the ball bearing assembly for axially adjusting the same.

5. In combination, a main saw supporting arm having bearing arms provided with transverse openings, a saw arbor, a ball bearing assembly for mounting the saw arbor in the opening of one of said bearing arms, a roller bearing assembly for mounting the saw arbor in the opening of the other bearing arm, the saw arbor being constrained to partake of the axial movement of the ball bearing assembly though free to rotate relative thereto, the saw arbor being axially as well as angularly movable with respect to the roller bearing assembly, and means cooperable with the ball bearing assemby for axially adjusting the same, said means including a manually operable adjusting screw carried by the bearing arm in which the ball bearing is mounted, a travelling nut operatively engaged with the adjusting screw and constrained to rectilinear movement, said travelling nut having a finger connecting the same with the ball bearing assembly.

6. In a machine of the character described, a support having a yoke provided with bearing arms, carrying links, adjustable bearings for connecting the lower end of the carrying links to the arms of the yoke, a swinging arm having a cross bar pivotally connected to the upper end of the carrying links, a standard upstanding from the support, said main swinging arm having its upper end slidably connected to the standard, and a saw assembly mounted on the lower end of the main swinging arm.

7. In a machine of the character described, a support having a yoke provided with bearing arms, a bearing block mounted for longitudinal adjustment on each arm, a sleeve bearing member mounted on each block for vertical adjustment, carrying links pivoted on the sleeve bearing members, a swinging arm having a cross bar pivotally connected to the carrying links, a standard upstanding from the support, said swinging arm having its upper end slidably connected to the standard, and a saw assembly mounted on the lower end of the swinging arm.

CHARLES J. CARLSON.